United States Patent Office 3,265,667
Patented August 9, 1966

3,265,667
CROSS-LINKED POLYTHIOUREA RESINS
Theodore H. Szawlowski, Wonder Lake, Walter E. Kramer, Niles, and Charanjit Rai, Crystal Lake, Ill., assignors, by mesne assignments, to Union Oil Company of California, Los Angeles, Calif., a corporation of California
No Drawing. Filed Dec. 31, 1962, Ser. No. 248,235
8 Claims. (Cl. 260—77.5)

This invention relates to novel cross-linked polyguanidine-polythiourea resins prepared by the reaction of linear polythiourea chains with primary diamines or primary polyamines. The degree of cross-linking is controlled, in accordance with one aspect of this invention, by the quantity of the diamine, or polyamine, used to cross-link the linear polythiourea chain. The properties of the resin are controlled by the types of amines used to form the linear polythiourea chain and the type and amount of diamine, or polyamine, used to cross-link the thiourea resin.

Polythioureas are known and described in the patent art. United States Patent 2,313,871 discloses polythioureas prepared by heating substantially stoichiometric proportions of a mixture of one or more diamines and a thiourea-forming derivative of thiocarbamic acid, for example carbon disulfide. It is known to condense an anhydride of a thiocarbamic acid with an aliphatic diamine, the amino groups of which are separated by a chain of at least three carbon atoms, and to heat the condensation product to give a thermoplastic substance of fiber-forming properties. The reaction is also carried out by using the diamine in the form of an aqueous emulsion containing a wetting agent. Fiber-formation is enhanced by heating the intermediate salt, formed in the emulsion process, with water or steam. Polymethylenediguanidine compounds are formed in accordance with United States Patent 2,007,770 by melting together a polymethylenediamine such as decamethylenediamine, and guanidine sulforganate at 130–160° C. Diguanidine compounds are formed by reacting about 2 moles of an S-alkyl isothiourea with a diamine in accordance with United States Patent 1,737,192. Some of these materials are useful as pesticides, as for example the linear polmeric hexamethyleneguanidine hydrobromide. Various di-urea compounds are known to react with another compound of the same type or with a diamine or by reacting an amino-urea with itself or with a similar compound to form polymers.

The reactions taking place in the formation of polythioureas may be represented as:

(1)
$$2H_2N—R^1—NH_2 + 2CS_2 \xrightarrow[\text{ether}]{\text{Solvent}}$$

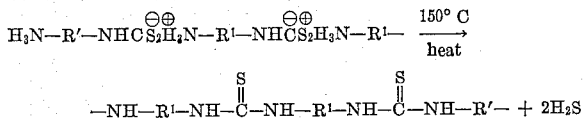

etc.

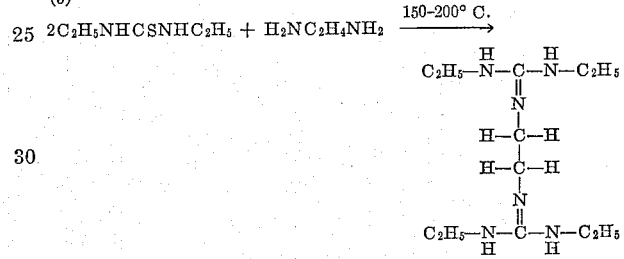

In reaction (1) polydithiocarbamates are formed by the reaction of carbon disulfide with a diamine. The polydithiocarbamate salt percipitates out of solution and can be filtered off after completion of the reaction. The formation of the dithiocarbamate is a highly exothermic reaction. In reaction (2), a linear polymer forms when the methylene bridge represented by the $R^1$ group exceeds —$(CH_2)_2$— or, in the case of aromatic or alicyclic diamines, if the amino groups are not located on adjacent carbon atoms. Hydrogen sulfide is split out and the linear polymer forms on heating.

In accordance with this invention, the linear polymer which forms in reaction (2) is cross-linked through the thiocarbonyl groups by reaction with a primary diamine. The reaction is illustrated as follows:

(3)

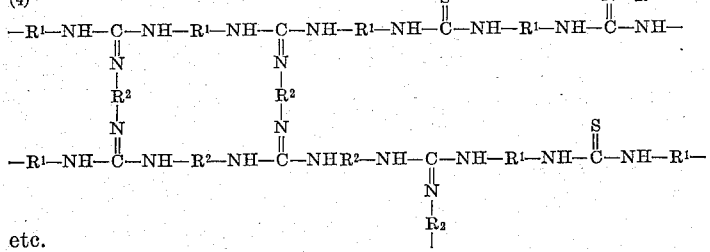

The simplified structure of the cross-linked polyguanidine-polythiourea resins of this invention is illustrated as:

(4)

$$-R^1-NH-\underset{\underset{R^2}{\underset{|}{\overset{\|}{N}}}}{\overset{}{C}}-NH-R^1-NH-\underset{\underset{R^2}{\underset{|}{\overset{\|}{N}}}}{\overset{}{C}}-NH-R^1-NH-\overset{S}{\overset{\|}{C}}-NH-R^1-NH-\overset{N-R^2-}{\overset{\|}{C}}-NH-$$

$$-R^1-NH-\overset{}{\overset{\|}{C}}-NH-R^2-NH-\overset{}{\overset{\|}{C}}-NHR^2-NH-\overset{S}{\overset{\|}{C}}-NH-R^1-NH-\overset{}{\overset{\|}{C}}-NH-R^1-$$

etc.

The pictorial structure (4) shows the manner in which the polythiourea backbone is cross-linked and that some of the thiocarbonyl groups remain unreacted. The hardness and toughness of the cross-linked resins of this invention are functions of the degree of cross-linking and the type of cross-linking compound used in reaction (3).

In the foregoing general description, to prepare the polythioureas, $R^1$ and $R^2$ can be the same or different alkylene chains of at least 2 methylene groups, or an aromatic hydrocarbon such as p-phenylene, m-phenylene, 1,4-naphthylene, 1,3-naphthylene, 1,4-anthrylene, 1,3-anthrylene, 5,8-phenanthrylene, 5,6-phenanthrylene, 1,4-naphthacylene, 1,3-naphthacylene, 1,4-chrysylene, 1,3-chrysylene, 1,3-pyrylene and 1,3-triphenylene, 1,4-triphenylene, bisphenylene compounds and compounds including the structure $CH_2(—\phi)_2$. The various diamines that can be used to prepare the initial linear polythioureas are illustrated by those aliphatic amines in which the pairs of reactive amino groups are linked by chains of methylene groups of at least 2 carbon atoms, including 1,10-diaminodecane; 1,6-diamino-hexane; 1,6-diamino-heptane; 1,7-diamino-octane; 1,8-diamino-nonane; 1,7-diamino-decane;

1,6-diamino-undecane; 1,7-diamino-dodecane; 1,8-diamino-tridecane; 1,6-diamino-eicosane. Since the number of amino groups is not limited to two, the various triamino and tetraamino homologues of the foregoing, such as 1,6,8-triamino-octane and 1,6,8-triaminodecane can be used. The number of —CH²— groups in the polyamine can be 2 to 10.

The aromatic diamines or polyamines that can be used are illustrated by p-phenylene diamine; m-phenylene diamine; the alpha,alpha'-diamino-xylenes; 1,4-diamino-naphthalene; 1,3-diamino-naphthalene, and the like.

The cross-linking amine used in accordance with this invention can have the same alkylene chain as the amine used in the preparation of the polythiourea except that the alkylene chain contains at least two methylene groups and it may not contain aromatic structures. Thus, the first member of the series is ethylene diamine, and other examples include 1,3-diamino propane; 1,4-diamino butane; 1,4-diamino pentane; 1,5-diaminopentane; 1,5-diaminohexane; 1,4-diamino hexane; 1,4-diaminoheptane; 1,5-diamino-heptane; 1,6-diaminoheptane; 1,6-diamino-octane; 1,7-diaminooctane, etc.

In order to illustrate the conventional method of preparing polyhexamethylenethiourea the following example is given:

EXAMPLE I

*Polyhexamethylenethiourea preparation*

One mole of hexamethylenediamine (116 grams) is dissolved in 500 mls. of dry ether, and two moles of carbon disulfide (152 g.) are dissolved separately in 200 mls. of dry ether. An ice bath is used to cool the hexamethylenediamine to 0°—5° C. and the $CS_2$ solution is added slowly, with stirring. As the $CS_2$ is added a yellow precipitate forms instantaneously. After all of the $CS_2$ is added, the dithiocarbamate salt is filtered off, washed with ether and dried. Then the salt is placed in a flask and is heated in a nitrogen atmosphere to 150° C. The $H_2S$ evolution causes frothing which subsides when the polymerization is complete. When the hot melt is drawn out, fibrous filaments are produced.

The cross-linked products of this invention are illustrated by the following examples:

EXAMPLE II

This experiment was performed to show that a cross-linked polyguanidine resin can be made by using a three-step process. In the first step, a long chain linear amino salt of dithiocarbamate was formed. 1,6-hexane-diamine (0.1 mol=11.62 g.) was dissolved in 50 ml. of ether and chilled in ice bath to approximately 0°–5° C. Carbon disulfide (0.2 mol=15.2 g.) was also cooled to same temperature and was added dropwise to the cold solution diamine-ether with rapid stirring. As each drop of $CS_2$ was added there was immediate formation of a yellow, salt-like product which was insoluble in ether. After complete addition of $CS_2$, the yellow-dithiocarbamate salts were filtered out and dried. This solid was found to be insoluble in hydrocarbons or ether but fairly soluble in water which demonstrated its ionic salt-like nature. This reaction can be represented by equation below:

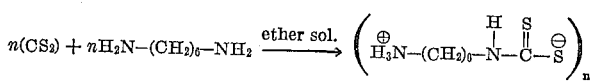

Since this reaction was strongly exothermic, the temperature was not allowed to rise above 10° C. by controlling the rate of addition of $CS_2$.

In the second step, the dried yellow salt was placed in a closed flask with $N_2$ gas inlet and outlet tubes. With $N_2$ gas slowly streaming through the inside of flask, the sample was heated up to 150° C. which started the evolution of large quantity of $H_2S$ which was identified as it left the exit tube by the blackening of moist lead acetate paper and by the characteristic odor of $H_2S$. Heating was continued until no more $H_2S$ was coming off. The hot molten polymer at the end of this reaction was found to be a light brown, viscous fluid which had a tendency to string out into long threads when a portion was removed with a spatula. The formation of this linear polythiourea polymer was represented by the following equation:

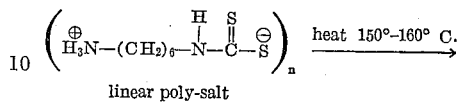

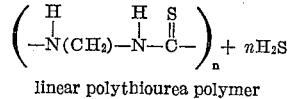

In the third step, the linear polymer was cooled to the solid state, crushed to a powder and mixed with ethylene diamine (0.1mol=6.01 g.) and heated under cover of a stream of $N_2$ gas to a temperature of 150° C. which was gradually raised to 200° C. As the temperature reached 150°–160° C. there was generated a large quantity of $H_2S$ as the reaction mixture thickened. The evolution of $H_2S$ and the thickening was used as evidence that the linear polymer was cross-linking. This reaction was not carried to full completion. Equation shown below represents what was taking place:

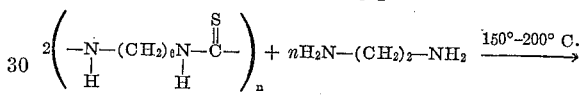

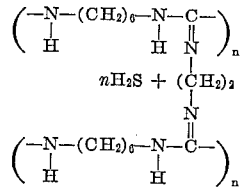

EXAMPLE III 1,6-hexanediamine (0.1 mol=11.62 g.) was dissolved in acetone and chilled down to 0°–5° F. by immersion in ice bath. Cold $CS_2$ was added (0.1 mol=7.61 g.) slowly, dropwise with continuous stirring. There was immediate formation of a light yellow precipitate. When the addition of $CS_2$ was complete, the yellow precipitate became tacky and coalescent. It separated to the bottom so that the acetone was poured out directly. This yellow solid was dried free of acetone and traces of $CS_2$. It was then placed in a test tube equipped with an $N_2$ flow inlet. The yellow salt was slowly heated under slow stream of $N_2$ gas to a temperature of 150° C. which caused $H_2S$ to be driven off and the yellow salt was converted to a light brown molten resinous liquid which had a tendency to string out into long filaments. The evolution of $H_2S$ and the appearance of a molten resinous polymer was considered as evidence that the linear amine salt of dithiocarbamate was converted to the linear polythiourea polymer by the elimination of $H_2S$ as depicted in equation below:

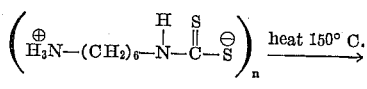

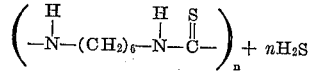

This experiment was not carried any further; that is, to the ultimate step of cross-linking the linear polythiourea by means of diamines.

EXAMPLE IV

This experiment was designed to show that a substituted thiourea (having the same basic structure as found in the linear polythiourea chain) can be made to react with a diamine to form a cross-linked product.

0.2 mol of 1,3-diethyl-2-thiourea (26.44 g.) was mixed with 0.1 mol (6.01) of ethylene diamine in 150 ml. of 2-ethylhexanol as a solvent. The mixture (with the thiourea powder in suspension in the solvent) was rapidly stirred and heated up to 150° C. The reaction flask had a reflux condenser attached so as to return the alcohol vapors to the pot and allow H₂S gas to escape. At a temperature of 150°–155° C. it was noticed that profuse gassing was taking place at the surfaces and the gases escaping from the top of the condenser were identified as H₂S by turning wet Pb Ac paper black. Later in the run, a slow stream of N₂ gas was introduced in order to help remove the H₂S generated in the reaction. The temperature was raised to 175° C. and the reflux was continued for several days but all the H₂S was not completely removed since the effluent N₂ gases showed traces of H₂S by the Pb Ac test at the end of this run. The reaction mixture turned dark green-brown and was considerably more viscous than before reaction. The evolution of H₂S and the increase in viscosity were used as evidence that cross-linking had taken place as shown in equation below:

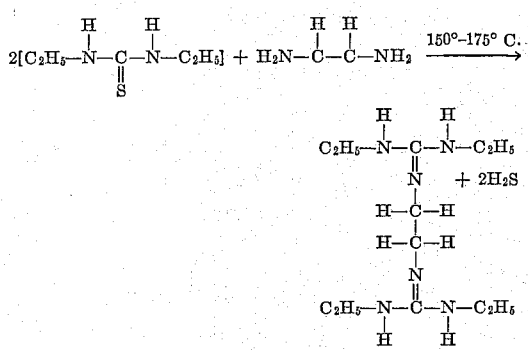

EXAMPLE V

*Polyhexamethylenethiourea cross-linked with diethylene triamine*

One equivalent of polyhexamethylenethiourea (158 grams) is heated with 103 grams of diethylene triamine until the evolution of H₂S ceases. The hard, inflexible polymer which results has the following structure:

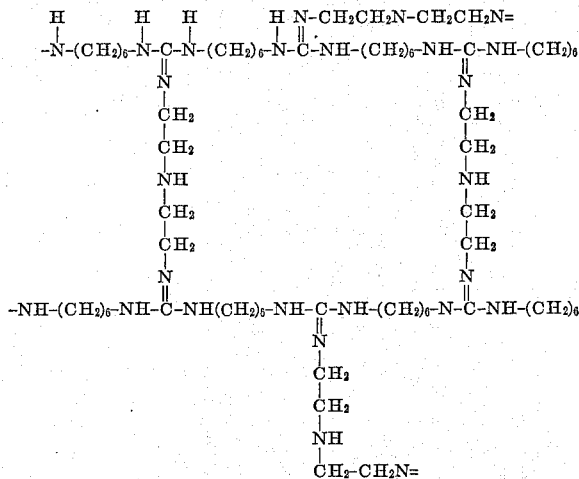

Although the invention has been demonstrated by a number of examples, these are to be construed as illustrative only, and various modifications coming within the scope of this invention will be apparent to one skilled in this art. The cross-linked polyguanidine-polythiourea final resin product will have a repeating unit of the formula

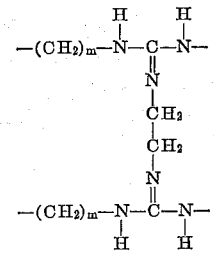

wherein $m$ is an integer and is at least 2. The value of $m$ in the final product is not critical to the invention and is a variable which will depend on the reactants, the length of time the polymerization reaction is allowed to proceed and also the conditions of the reaction. The reaction temperature can be from about 100° C. to 250° C. and is preferably about 140–170° C. for best results in reacting the linear polythiourea with the polyamine. The integer $m$ will have a value of about 500 or more for low molecular weight polymers, a value of about 1000 to 1500 for medium molecular weight polymers and a value of 5000 to 10,000 or more for high molecular weight polymers. The term polyamine as used in the specification and claims is intended to exclude monoamino compounds and include diamines to tetramines.

The embodiments of this invention in which an exclusive property or privilege is claimed are defined as follows:

1. The reaction product consisting of (1) about 2 parts of a linear polythiourea, prepared by the reaction of a polyamine having only 2 to 20 carbon atoms per molecule and 2 to 4 primary amino groups per molecule with carbon disulfide to form the dithiocarbamate and heating said dithiocarbamate to form the linear polythiourea, reacted with (2) about 1 part of an aliphatic amine having 2 to 10 methylene groups and at least 2 primary amino groups per molecule at a temperature of about 100° to about 250° C. for a time sufficient to eliminate hydrogen sulfide.

2. The reaction product in accordance with claim 1 in which said aliphatic amine is a member of the group consisting of ethylene diamine, diethylene triamine, 1,3-diamino propane, 1,4-diamino butane, 1,4-diamino pentane, 1,5-diaminopentane, 1,5-diaminohexane, 1,4-diamino hexane, 1,4-diaminoheptane, 1,5-diamino-heptane, 1,6-diaminoheptane, 1,6-diaminooctane and 1,7-diaminooctane.

3. The reaction product in accordance with claim 1 in which said polyamine is hexamethylene diamine and said aliphatic amine is ethylene diamine.

4. The reaction product in accordance with claim 1 in which said polyamine is hexamethylene diamine and said aliphatic amine is diethylene diamine.

5. The reaction product in accordance with claim 1 in which said polyamine is hexamethylene diamine and said aliphatic amine is diethylene triamine.

6. The process which consists in reacting a linear polythiourea, prepared by the reaction of a polyamine having only 2 to 4 primary amino groups and 2 to 20 carbon atoms per molecule with carbon disulfide to form the dithiocarbamate and heating said dithiocarbamate to form the linear polythiourea, with an aliphatic amine having 2 to 10 methylene groups and at least 2 primary amino groups per molecule, using a ratio of about 2 parts of said polythiourea to 1 part of said aliphatic amine at a temperature of about 100° to 250° C. for a time sufficient to eliminate hydrogen sulfide from said reaction.

7. The process in accordance with claim 6 in which said polyamine is hexamethylene diamine and said aliphatic amine is ethylene diamine.

8. The process in accordance with claim 6 in which said polyamine is hexamethylene diamine and said aliphatic amine is diethylene triamine.

References Cited by the Examiner
UNITED STATES PATENTS

| | | | |
|---|---|---|---|
| 2,145,242 | 1/1939 | Arnold | 260—77.5 XR |
| 2,313,871 | 3/1943 | Hanford et al. | 260—2 |
| 2,325,586 | 8/1943 | Bolton et al. | 260—564 |
| 2,595,400 | 5/1952 | Maynard | 260—77.5 |
| 2,828,291 | 3/1958 | Saunders | 260—77.5 |
| 3,080,343 | 3/1963 | Ham | 260—77.5 |

LEON J. BERCOVITZ, *Primary Examiner.*

DONALD E. CZAJA, *Examiner.*

J. J. KLOCKO, *Assistant Examiner.*